US012663135B2

(12) United States Patent
Jun et al.

(10) Patent No.: US 12,663,135 B2
(45) Date of Patent: Jun. 23, 2026

(54) LAMP FOR VEHICLE

(71) Applicant: HYUNDAI MOBIS CO., LTD., Seoul (KR)

(72) Inventors: Na Ram Jun, Yongin-si (KR); Tae Yang Park, Yongin-si (KR); Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/290,781

(22) Filed: Aug. 5, 2025

(65) Prior Publication Data

US 2026/0153207 A1 Jun. 4, 2026

(30) Foreign Application Priority Data

Dec. 4, 2024 (KR) ........................ 10-2024-0178616
Dec. 4, 2024 (KR) ........................ 10-2024-0178617
Dec. 12, 2024 (KR) ........................ 10-2024-0184913

(51) Int. Cl.
*F21S 41/275* (2018.01)

(52) U.S. Cl.
CPC .................................. *F21S 41/275* (2018.01)

(58) Field of Classification Search
CPC .......................... F21S 41/275; F21W 2102/13
USPC .......................................................... 362/521
See application file for complete search history.

(56) References Cited

U.S. PATENT DOCUMENTS 10,260,697 B2 * 4/2019 Yamamoto ............ F21S 41/192
2020/0088859 A1 * 3/2020 Shepard .................. G01S 17/42

* cited by examiner

*Primary Examiner* — Toan C Ly
(74) *Attorney, Agent, or Firm* — NSIP Law

(57) ABSTRACT

A lamp for a vehicle includes a light source, an inner lens part disposed forward of the light source, and a micro-cylinder lens part disposed forward of the inner lens part. The inner lens part includes a plurality of unit lenses disposed in a horizontal direction and physically connected to one another. The micro-cylinder lens part includes a plurality of micro-lenses disposed in the horizontal direction and physically connected to one another. A horizontal focal point of an incident surface of each of a first subset of the plurality of unit lenses is different from a horizontal focal point of an incident surface of each of a second subset of the other unit lenses.

20 Claims, 12 Drawing Sheets

LAMP FOR VEHICLE

CROSS-REFERENCE TO RELATED APPLICATION

This application claims priority to and the benefit of Korean Patent Application No. 10-2024-0178616 filed in the Korean Intellectual Property Office on Dec. 4, 2024, Korean Patent Application No. 10-2024-0178617 filed in the Korean Intellectual Property Office on Dec. 4, 2024, and Korean Patent Application No. 10-2024-0184913 filed in the Korean Intellectual Property Office on Dec. 12, 2024, the entire contents of which are incorporated herein by reference.

TECHNICAL FIELD

The present disclosure relates to a lamp for a vehicle.

BACKGROUND

There is an increasing demand for lamps for vehicles with aesthetic appearances as the lamps for vehicles have a significant impact on aesthetic external appearances of the vehicles.

Meanwhile, a lamp for a vehicle generally includes a light source, such as an LED, configured to emit light, and an inner lens. In the related art, an aspherical lens is typically used as the inner lens. However, there is a problem in that a degree of freedom of the aspherical lens remarkably deteriorates in terms of a shape and design thereof. This problem degrades a degree of design freedom of the lamp for a vehicle.

In addition, recently, there has been an attempt to apply a micro-lens such as a micro-cylinder lens or a micro-lens array to a new type of lamp for a vehicle. However, there is a problem in that the lamp for a vehicle, to which the micro-lens is applied, is difficult to manufacture because it is difficult to manage a tolerance during an assembling process.

In particular, in the case of the lamp for a vehicle to which the micro-lens is applied, a shape of the micro-lens also needs to be improved so that the lamp creates a light distribution pattern that suits the purpose thereof. However, in the related art, there is a problem in that a shape of a lens structure including the micro-lens is simple, which restricts a light distribution pattern that may be formed by the lamp for a vehicle to which the micro-lens is applied.

SUMMARY

The present disclosure has been made in an effort to provide a new type of lamp for a vehicle, in which a degree of design freedom is improved, which improves an aesthetic appearance in comparison with the related art.

The present disclosure has also been made in an effort to create light distribution patterns with various shapes that suit the purpose of a lamp for a vehicle to which a micro-lens is applied.

In order to achieve the above-mentioned objects, one aspect of the present disclosure provides a lamp for a vehicle, the lamp including: a light source, an inner lens part disposed forward of the light source, and a micro-cylinder lens part disposed forward of the inner lens part. The inner lens part includes a plurality of unit lenses disposed in a horizontal direction and physically connected to one another. The micro-cylinder lens part includes a plurality of micro-lenses disposed in the horizontal direction and physically connected to one another. A horizontal focal point of an incident surface of each of a first subset of the plurality of unit lenses is different from a horizontal focal point of an incident surface of each of a second subset of the other unit lenses.

An emergent surface of the inner lens part may have a smooth curved shape.

The inner lens part may have a geometric shape in which horizontal focal points of incident surfaces of the unit lenses become distant, in a forward/rearward direction, from the unit lenses as a distance from a first point in the inner lens part increases in the horizontal direction.

The inner lens part may have a geometric shape in which the horizontal focal points of the incident surfaces of the unit lenses become close, in the forward/rearward direction, to the unit lenses as a distance from a second point in the inner lens part increases in the horizontal direction.

The first point may be disposed in a horizontal center region of the inner lens part.

Each of the plurality of unit lenses may optically correspond to a respective one the plurality of micro-lenses.

The inner lens part may have a geometric shape that becomes close to a rear side as a distance from a first side decreases in the horizontal direction.

An emergent surface of the inner lens part may have a geometric shape in which a curvature of an end region of a first side based on the horizontal direction is larger than a curvature of another region.

A first subset of the plurality of micro-lenses in the micro-cylinder lens part may be positioned forward of a second subset of the micro-lenses in the micro-cylinder lens part.

The plurality of micro-lenses in the micro-cylinder lens part may be positioned to become close to a rear side as a distance from a first side decreases in the horizontal direction.

Widths in a forward/rearward direction of the plurality of micro-lenses in the micro-cylinder lens part may correspond to one another.

A width in a leftward/rightward direction of each of a first subset of the plurality of micro-lenses in the micro-cylinder lens part may be different from a width in the leftward/rightward direction of each of a second subset of the micro-lenses in the micro-cylinder lens part.

Curvatures of incident surfaces or emergent surfaces of the plurality of micro-lenses in the micro-cylinder lens part may correspond to one another.

A width in a leftward/rightward direction of each of one or more micro-lenses, which are positioned at an end of the first side based on the horizontal direction among the plurality of micro-lenses in the micro-cylinder lens part, may be smaller than a width in the leftward/rightward direction of each of the other micro-lenses in the micro-cylinder lens part.

In order to achieve the above-mentioned objects, another aspect of the present disclosure provides a lamp for a vehicle, the lamp including: a light source; a micro-cylinder lens part disposed forward of the light source, in which the micro-cylinder lens part includes a plurality of micro-lenses disposed in a horizontal direction and physically connected to one another, and in which a horizontal cross-sectional shape of an incident surface or an emergent surface of each of a first subset of the plurality of micro-lenses disposed in the micro-cylinder lens part is different from a horizontal cross-sectional shape of an incident surface or an emergent surface of each of a second subset of the micro-lenses.

A first group of the plurality of micro-lenses disposed in the micro-cylinder lens part may be grouped into a first micro-lens group in which a curvature of a horizontal cross-section of the incident surface is a first incident surface curvature, and a second group of the micro-lenses disposed in the microphone cylinder lens part may be grouped into a second micro-lens group in which a curvature of a horizontal cross-section of the incident surface is a second incident surface curvature smaller than the first incident surface curvature.

A third group of the micro-lenses disposed in the micro-cylinder lens part may be grouped into a third micro-lens group in which a curvature of a horizontal cross-section of the incident surface is a third incident surface curvature smaller than the second incident surface curvature.

The second micro-lens group may be disposed between the first micro-lens group and the third micro-lens group in a leftward/rightward direction W.

A horizontal cross-section of the emergent surface of each micro-lens in the first micro-lens group may have a first emergent surface curvature, a horizontal cross-section of the emergent surface of each micro-lens in the second micro-lens group may have a second emergent surface curvature smaller than the first emergent surface curvature, and a horizontal cross-section of the emergent surface of each micro-lens in the third micro-lens group may have a third emergent surface curvature smaller than the second emergent surface curvature.

A horizontal cross-section of the incident surface or the emergent surface of the micro-cylinder lens part may include an alternation section in which concave regions having concave shapes and convex regions having convex shapes are alternately disposed in a leftward/rightward direction W, and the entire alternation section may have a smooth shape.

A horizontal cross-section of the incident surface of the micro-cylinder lens part may include an alternation incident section in which concave incident regions having concave shapes and convex incident regions having convex shapes are alternately disposed in a leftward/rightward direction W, and a horizontal cross-section of the emergent surface of the micro-cylinder lens part may include an alternation emergent section in which concave emergent regions having concave shapes and convex emergent regions having convex shapes are alternately disposed in the leftward/rightward direction W.

The concave incident region in the alternation incident section may face the concave emergent region in the alternation emergent section in a forward/rearward direction A.

The convex incident region in the alternation incident section may face the convex emergent region in the alternation emergent section in a forward/rearward direction A.

The micro-cylinder lens part may include a variable curvature incident section in which horizontal curvatures of the incident surfaces of the plurality of micro-lenses gradually decrease in one direction of a leftward/rightward direction W.

Horizontal curvatures of the emergent surfaces, which face the variable curvature incident section in a forward/rearward direction A among the emergent surfaces of the plurality of micro-lenses provided in the micro-cylinder lens part, may correspond to one another.

The micro-cylinder lens part may include a variable curvature emergent section in which horizontal curvatures of the emergent surfaces of the plurality of micro-lenses gradually decrease in one direction of a leftward/rightward direction W.

Horizontal curvatures of the incident surfaces, which face the variable curvature emergent section in a forward/rearward direction A among the incident surfaces of the plurality of micro-lenses provided in the micro-cylinder lens part, may correspond to one another.

The micro-cylinder lens part may include a concave curvature incident section in which horizontal cross-sections of the incident surfaces of the plurality of micro-lenses each have a concave shape.

Horizontal cross-sections of the emergent surfaces, which face the concave curvature incident section in a forward/rearward direction A among the emergent surfaces of the plurality of micro-lenses provided in the micro-cylinder lens part, may each have a convex shape.

The micro-cylinder lens part may include a concave curvature emergent section in which horizontal cross-sections of the emergent surfaces of the plurality of micro-lenses each have a concave shape.

Horizontal cross-sections of the incident surfaces, which face the concave curvature emergent section in a forward/rearward direction A among the incident surfaces of the plurality of micro-lenses provided in the micro-cylinder lens part, may each have a convex shape.

According to the present disclosure, it is possible to provide a new type of lamp for a vehicle, in which a degree of design freedom is improved, which improves an aesthetic appearance in comparison with the related art.

In addition, according to the present disclosure, it is possible to create light distribution patterns with various shapes that suit the purpose of the lamp for a vehicle to which the micro-lens is applied.

DETAILED DESCRIPTION

Hereinafter, a lamp for a vehicle according to an embodiment of the present disclosure will be described with reference to the drawings.

Lamp for Vehicle

Figure 1:
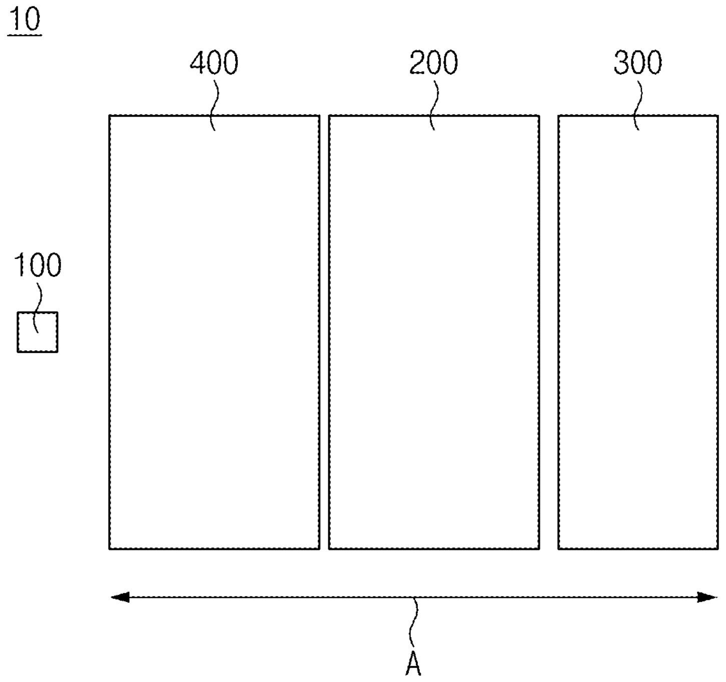
FIG. 1 is a side view schematically illustrating main components of a lamp for a vehicle according to an embodiment of the present disclosure.
Figure 2:
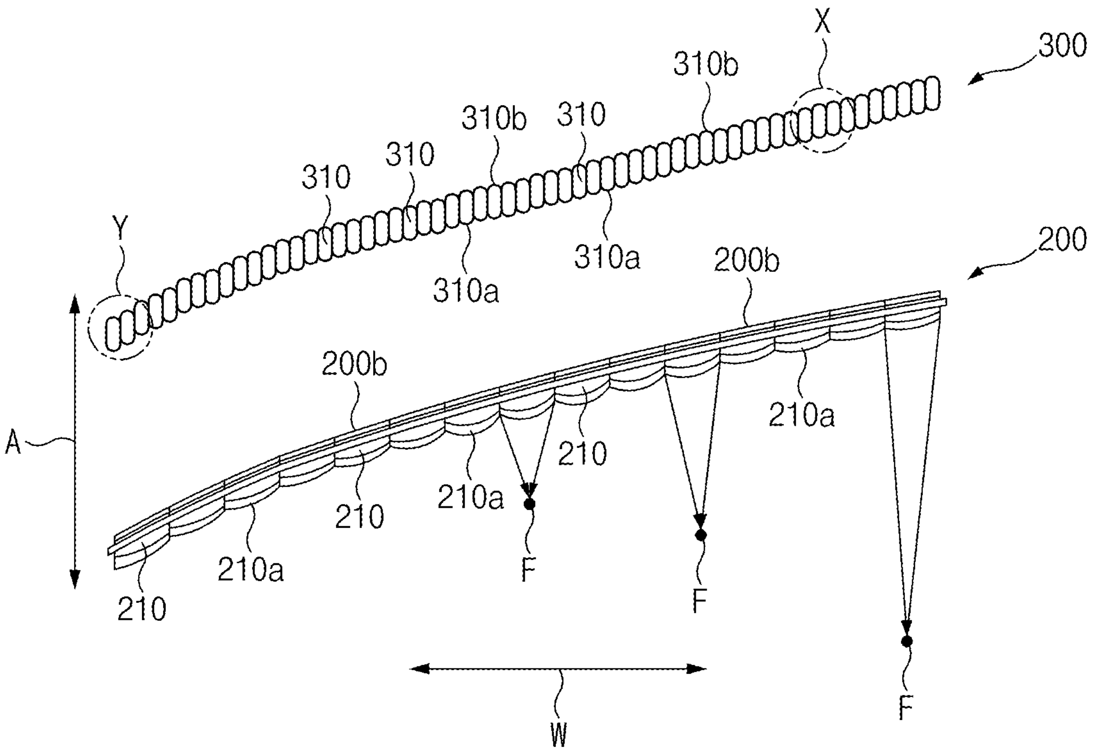
FIG. 2 is a top plan view illustrating an inner lens part and a micro-cylinder lens part provided in the lamp for a vehicle according to the embodiment of the present disclosure.
Figure 3:
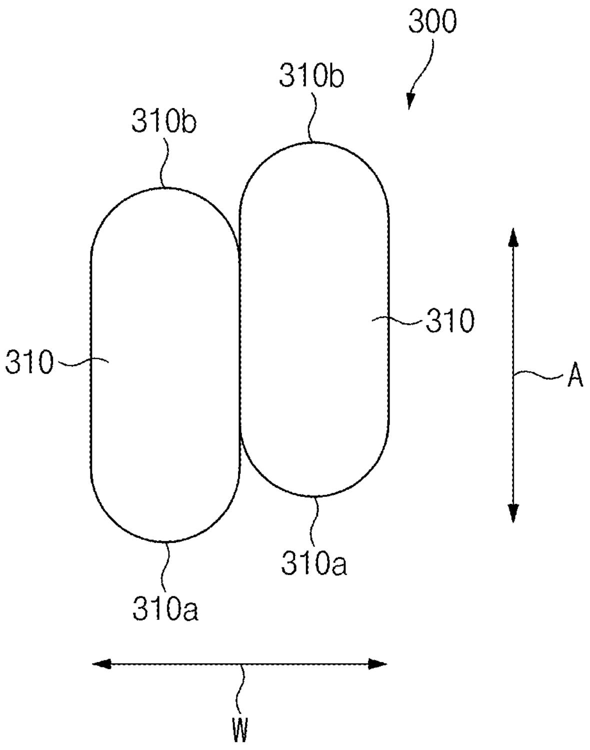
FIG. 3 is an enlarged view illustrating a micro-lens provided in region X in FIG. 2.
Figure 4:
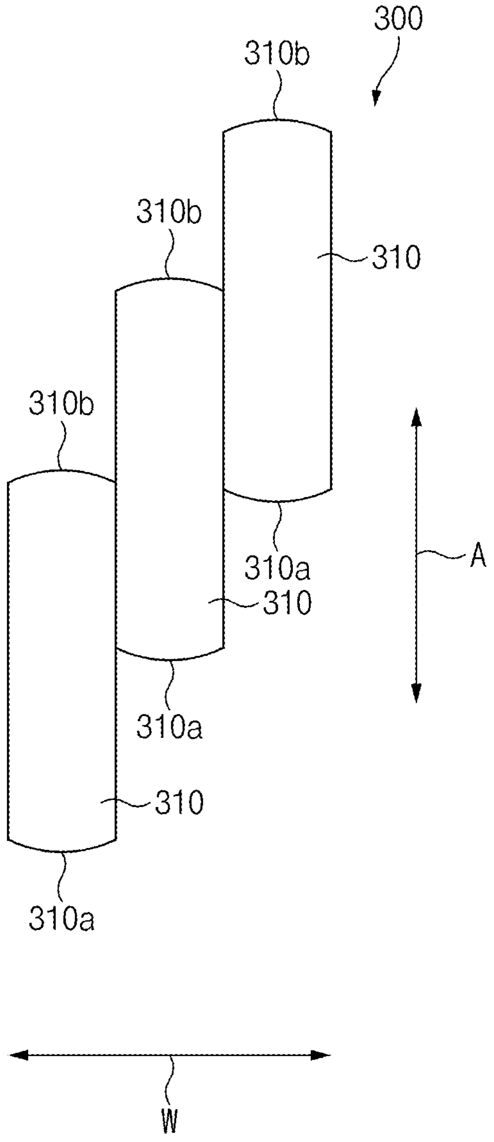
FIG. 4 is an enlarged view illustrating a micro-lens provided in region Y in FIG. 2.

FIG. 1 is a side view schematically illustrating main components of a lamp for a vehicle according to an embodiment of the present disclosure, and FIG. 2 is a top plan view illustrating an inner lens part and a micro-cylinder lens part provided in the lamp for a vehicle according to the embodiment of the present disclosure. Further, FIG. 3 is an enlarged view illustrating a micro-lens provided in region X in FIG. 2, and FIG. 4 is an enlarged view illustrating a micro-lens provided in region Y in FIG. 2.

As illustrated in FIGS. 1 and 2, a lamp 10 for a vehicle (hereinafter, referred to as a 'lamp') according to the present disclosure may include a light source 100, an inner lens part 200 provided forward of the light source 100, and a micro-cylinder lens part 300 provided forward of the inner lens part 200. The micro-cylinder lens part 300 may include a plurality of micro-lenses 310 extending in an upward/downward direction and having an approximately cylindrical shape. More specifically, the micro-cylinder lens part 300 may include the plurality of micro-lenses 310 disposed in a horizontal direction and physically connected to one another. A width of the micro-lens 310 in a leftward/rightward direction W may be approximately several millimeters to several centimeters.

Meanwhile, the inner lens part 200 may include a plurality of unit lenses 210 disposed in the horizontal direction and physically connected to one another. That is, according to the present disclosure, the plurality of unit lenses 210, which constitute the inner lens part 200, may be integrated with one another.

In addition, according to the present disclosure, a width in the leftward/rightward direction W of the unit lens 210, which constitutes the inner lens part 200, may be larger than a width in the leftward/rightward direction W of the micro-lens 310 that constitutes the micro-cylinder lens part 300. Therefore, the plurality of unit lenses 210 may each optically correspond to the plurality of micro-lenses 310. In this case, it can be seen that one unit lens 210 optically corresponds to the plurality of micro-lenses 310 in case that light, which is emitted from the light source 100 and enters one unit lens 210, enters some of the plurality of micro-lenses 310 that constitute the micro-cylinder lens part 300.

Meanwhile, according to the present disclosure, a horizontal focal point F of an incident surface **210*a* of each of some of the plurality of unit lenses 210, which constitute the inner lens part 200, may be different from a horizontal focal point F of an incident surface 210*a* of each of some of the other unit lenses 210**.

That is, as illustrated in FIG. 2, the inner lens part 200 may have a geometric shape in which the horizontal focal points F of the incident surfaces **210*a* of the unit lenses 210 become distant, in a forward/rearward direction A, from the unit lenses 210 as the distance from one point increases in the horizontal direction, and the inner lens part 200 may have a geometric shape in which the horizontal focal points F of the incident surfaces 210*a* of the unit lenses 210 become close, in the forward/rearward direction A, to the unit lenses 210 as the distance from the other point increases in the horizontal direction. In this case, the horizontal focal point F of the incident surface 210*a* of the unit lens 210 positioned at one point in the inner lens part 200 may be positioned at a foremost side, and the horizontal focal point F of the incident surface 210*a* of the unit lens 210 positioned at the other point in the inner lens part 200 may be positioned at a rearmost side. For example, with reference to FIG. 2, one point may be provided in a horizontal center region of the inner lens part 200, and the other point may be provided in a horizontal end region of the inner lens part 200**.

The lamp 10 for a vehicle according to the present disclosure may be configured to create a low-beam light distribution pattern. In this case, the light passing through the unit lenses 210 positioned at one point and positioned in the vicinity of one point in the inner lens part 200 may create a hot-zone light distribution pattern of the low-beam light distribution pattern, and the light passing through the unit lenses 210 positioned at the other point and positioned in the vicinity of the other point in the inner lens part 200 may create a wide-zone light distribution pattern of the low-beam light distribution pattern.

Meanwhile, as described above, the incident surface **210*a* of the unit lens 210 provided in the inner lens part 200 may have the horizontal focal point F. In this case, the incident surface 210*a* of the inner lens part 200 may have a shape in which convex regions are repeatedly disposed in the horizontal direction when the inner lens part 200 is viewed from above. In contrast, an emergent surface 200*b* of the inner lens part 200 or the unit lens 210** may have a smooth curved shape.

Meanwhile, according to the present disclosure, the inner lens part 200 may have a geometric shape that becomes close to the rear side as the distance from a first side decreases in the horizontal direction. FIG. 2 illustrates a state in which the inner lens part 200 has a shape that becomes close to the rear side as the distance from the left side decreases in the horizontal direction.

In this case, according to the present disclosure, the emergent surface **200*b* of the inner lens part 200 may have a geometric shape in which a curvature of an end region of the first side based on the horizontal direction is larger than a curvature of another region. It may be understood that the emergent surface 200*b* of the inner lens part 200 is relatively greatly curved in the end region of the first side based on the horizontal direction. In case that the lamp 10** according to the present disclosure is mounted in the vehicle, the end region of the first side based on the horizontal direction may correspond to an outer end region of the vehicle based on the leftward/rightward direction.

With continued reference to FIG. 2, some of the plurality of micro-lenses 310 in the micro-cylinder lens part 300 of the lamp according to the present disclosure may be positioned forward of some of the other micro-lenses 310 in the micro-cylinder lens part 300. As described above, the inner lens part 200 may have a shape that becomes close to the rear side as the distance from the first side decreases in the horizontal direction, i.e., a shape that is curved rearward. The micro-cylinder lens part 300 may also have a shape corresponding to the shape of the inner lens part 200. More specifically, the plurality of micro-lenses 310 in the micro-cylinder lens part 300 may be positioned to become close to the rear side as the distance from the first side decreases in the horizontal direction.

Meanwhile, the widths of the plurality of micro-lenses 310 in the forward/rearward direction A in the micro-cylinder lens part 300 may correspond or be equal to one another. In contrast, the width in the leftward/rightward direction W of each of at least some of the plurality of micro-lenses 310 in the micro-cylinder lens part 300 may be different from the width of each of some of the other micro-lenses 310. That is, with reference to FIGS. 3 and 4, the width in the leftward/rightward direction W of each of some of the plurality of micro-lenses 310 in the micro-cylinder lens part 300 may be different from the width in the leftward/rightward direction W of each of some of the other micro-lenses 310 in the micro-cylinder lens part 300.

More particularly, among the plurality of micro-lenses 310 in the micro-cylinder lens part 300, a width (see FIG. 4) in the leftward/rightward direction W of each of one or more micro-lenses 310 positioned at an end of the first side based on the horizontal direction may be smaller than a width (see FIG. 3) in the leftward/rightward direction W of each of the other micro-lenses 310 in the micro-cylinder lens part 300. This is because the curvature of the emergent surface 200*b* of the unit lens 210 of the inner lens part 200 positioned at the end of the first side based on the horizontal direction is relatively large. That is, according to the present disclosure, the width of the micro-lens 310, which faces the region of the inner lens part 200 having a relatively large curvature, is small. Therefore, it is possible to prevent glare that may occur when the light entering one micro-lens 310 enters another micro-lens 310 before the light exits one micro-lens 310. Further, it is possible to manufacture the micro-cylinder lens part 300 having a large inclination in the forward/rearward direction.

In contrast, according to the present disclosure, curvatures of incident surfaces 310*a* or emergent surfaces 310*b* of the plurality of micro-lenses 310 in the micro-cylinder lens part 300 may correspond or be equal to one another even in a case in which the widths in the leftward/rightward direction W of the plurality of micro-lenses 310 in the micro-cylinder lens part 300 are different from one another. That is, the curvatures of the incident surfaces 310*a* of the plurality of micro-lenses 310 may correspond or be equal to one another, and the curvatures of the emergent surfaces 310*b* of the plurality of micro-lenses 310 may correspond or be equal to one another.

Meanwhile, as illustrated in FIG. 1, the lamp 10 according to the present disclosure may further include a light collection member 400 provided between the light source 100 and the inner lens part 200 and configured to collect the light emitted from the light source 100. For example, the light collection member 400 may be a collimator.

Hereinafter, a lamp for a vehicle according to another embodiment of the present disclosure will be described with reference to the drawings.

Lamp for Vehicle

Figure 5:
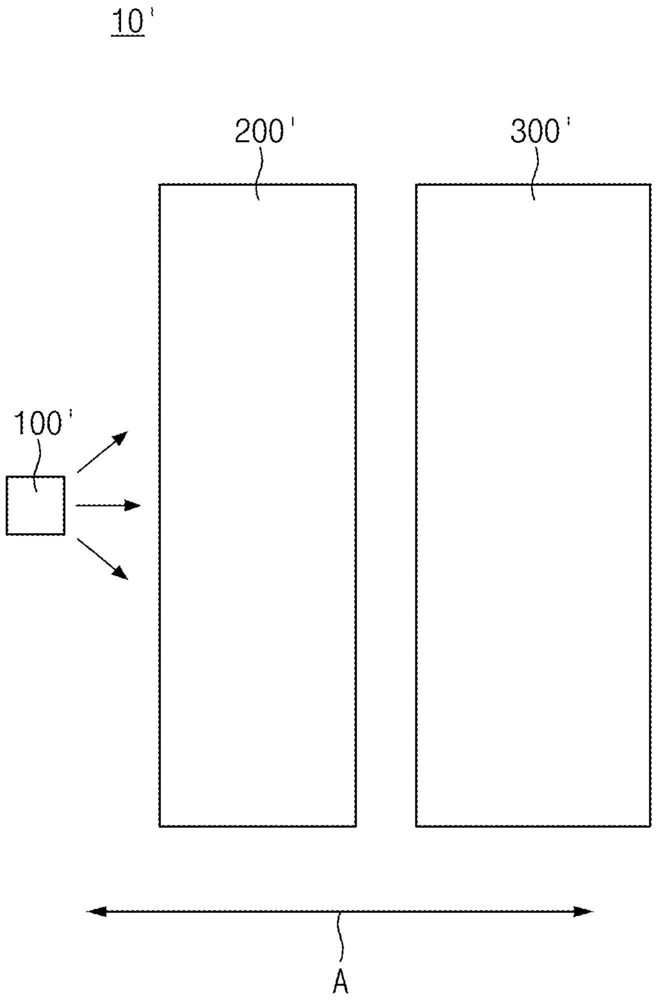
FIG. 5 is a side view schematically illustrating main components of a lamp for a vehicle according to another embodiment of the present disclosure.
Figure 6:
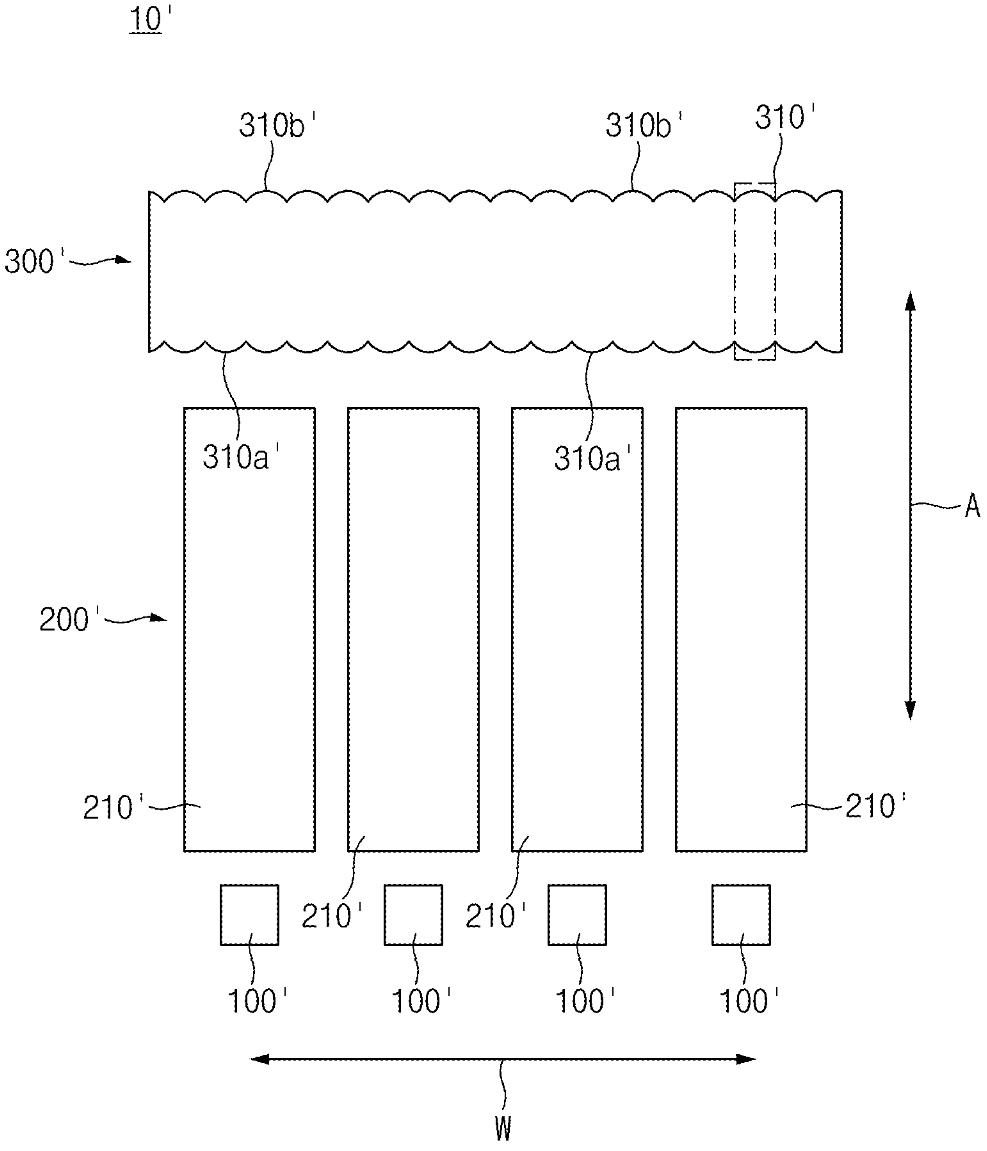
FIG. 6 is a top plan view of the lamp for a vehicle according to another embodiment of the present disclosure.

FIG. 5 is a side view schematically illustrating main components of a lamp for a vehicle according to another embodiment of the present disclosure, and FIG. 6 is a top plan view of the lamp for a vehicle according to another embodiment of the present disclosure.

The lamp for a vehicle (hereinafter, referred to as a 'lamp') according to another embodiment of the present disclosure may be configured to create a low-beam light distribution pattern or a high-beam light distribution pattern. However, the lamp according to another embodiment of the present disclosure may, of course, be configured to create other types of light distribution patterns.

As illustrated in FIGS. 5 and 6, a lamp 10' according to another embodiment of the present disclosure may include light sources 100' configured to emit light, and a micro-cylinder lens part 300' provided forward of the light source 100'. For example, the light source 100' may be an LED.

Meanwhile, according to another embodiment of the present disclosure, the micro-cylinder lens part 300' may include a plurality of micro-lenses 310' disposed in the horizontal direction and physically connected to one another. More specifically, the micro-cylinder lens part 300' may have a structure in which the plurality of micro-lenses 310' are arranged in the horizontal direction. A width of the micro-lens 310' in the leftward/rightward direction W may be several millimeters to several centimeters. Meanwhile, the micro-cylinder lens part disclosed in the present specification is configured such that the plurality of micro-lenses are connected and integrated. Therefore, it is noted that the micro-cylinder lens part is distinguished from a micro-lens array or the like in which separate incident lens arrays are joined to one another with shield members interposed therebetween.

Meanwhile, the lamp 10' according to another embodiment of the present disclosure may further include an inner lens part 200' provided between the light source 100' and the micro-cylinder lens part 300'. More specifically, the inner lens part 200' may be provided forward of the light source 100' and provided rearward of the micro-cylinder lens part 300'.

In addition, according to another embodiment of the present disclosure, the inner lens part 200' may include a plurality of regions physically spaced apart from one another. More specifically, as illustrated in FIG. 6, the inner lens part 200' may include a plurality of unit lenses 210' provided to be spaced apart from one another in the horizontal direction (e.g., the leftward/rightward direction W). The plurality of unit lenses 210' in the inner lens part 200' may be provided to face one micro-cylinder lens part 300' in the forward/rearward direction A. Meanwhile, the light sources 100' may also be provided as a plurality of light sources 100' provided in the lamp 10' while corresponding to the number of unit lenses 210' in the inner lens part 200'.

Meanwhile, according to another embodiment of the present disclosure, the plurality of unit lenses 210' may each optically correspond to the plurality of micro-lenses 310'. In this case, it can be seen that one unit lens 210' optically corresponds to the plurality of micro-lenses 310' in case that light, which is emitted from the light source 100' and enters one unit lens 210', enters some of the plurality of micro-lenses 310' that constitute the micro-cylinder lens part 300'.

According to another embodiment of the present disclosure, the micro-cylinder lens part 300' provided in the lamp 10' may have various geometric shapes. Hereinafter, geometric characteristics of the micro-cylinder lens part 300' provided in the lamp 10' according to another embodiment of the present disclosure will be described in detail.

According to another embodiment of the present disclosure, a horizontal cross-sectional shape of an incident surface 310*a'* or an emergent surface 310*b'* of each of some of the plurality of micro-lenses 310' provided in the micro-cylinder lens part 300' may be different from a horizontal cross-sectional shape of an incident surface 310*a'* or an emergent surface 310*b'* of each of some of the other micro-lenses 310'. That is, according to another embodiment of the present disclosure, i) the horizontal cross-sectional shape of the incident surface 310*a'* of each of some of the plurality of micro-lenses 310' provided in the micro-cylinder lens part 300' may be different from the horizontal cross-sectional shape of the incident surface 310*a'* or the emergent surface 310*b'* of each of some of the other micro-lenses 310', or ii) the horizontal cross-sectional shape of the emergent surface

310b' of each of some of the plurality of micro-lenses 310' provided in the micro-cylinder lens part 300' may be different from the horizontal cross-sectional shape of the incident surface 310a' or the emergent surface 310b' of each of some of the other micro-lenses 310'.

Figure 7:
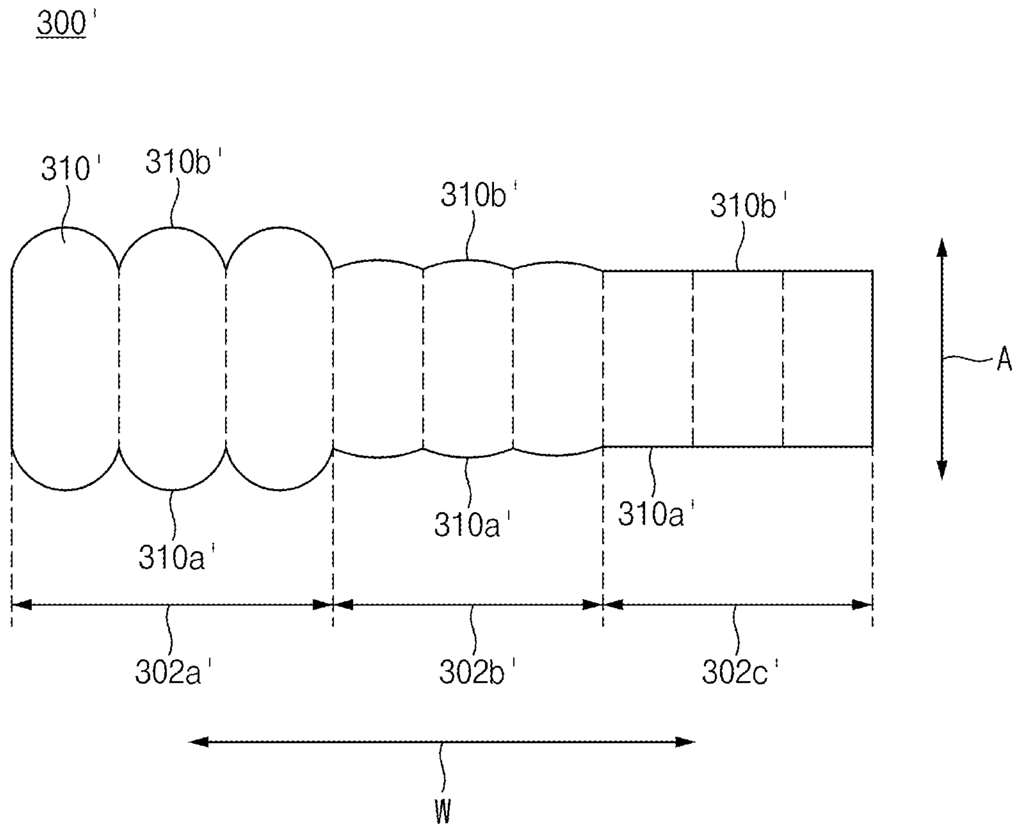
FIG. 7 is a top plan view of a first example of a micro-cylinder lens part provided in the lamp for a vehicle according to another embodiment of the present disclosure.

FIG. 7 is a top plan view of a first example of the micro-cylinder lens part provided in the lamp for a vehicle according to another embodiment of the present disclosure.

With reference to FIG. 7, some of the plurality of micro-lenses 310' provided in the micro-cylinder lens part 300' may be grouped into a first micro-lens group 302a' in which a curvature of a horizontal cross-section of the incident surface 310a' is a first incident surface curvature, and some of the other micro-lenses 310' provided in the micro-cylinder lens part 300' may be grouped into a second micro-lens group 302b' in which a curvature of a horizontal cross-section of the incident surface 310a' is a second incident surface curvature smaller than the first incident surface curvature.

In addition, some of the other micro-lenses 310' provided in the micro-cylinder lens part 300' may be grouped into a third micro-lens group 302c' in which a curvature of a horizontal cross-section of the incident surface 310a' is a third incident surface curvature smaller than the second incident surface curvature. FIG. 3 illustrates a state in which the first micro-lens group 302a', the second micro-lens group 302b', and the third micro-lens group 302c' are sequentially disposed in a direction from the left side toward the right side. That is, the second micro-lens group 302b' may be provided between the first micro-lens group 302a' and the third micro-lens group 302c' in the leftward/rightward direction W. For example, the horizontal cross-section of the incident surface 310a' of the micro-lens 310' provided in the third micro-lens group 302c' may have a flat shape, and the horizontal cross-section of the incident surface 310a' of the micro-lens 310' provided in the first and second micro-lens groups 302a' and 302b' may have a shape convex rearward.

In case that the lamp according to another embodiment of the present disclosure includes the micro-cylinder lens part 300' according to the first example, the lamp may create a low-beam light distribution pattern. In this case, according to the present disclosure, the light, which is emitted from the light source 100' and propagates to the outside through the first micro-lens group 302a', may create a hot-zone light distribution region that defines a central region of the low-beam light distribution pattern, the light, which propagates to the outside through the third micro-lens group 302c', may create a wide-zone light distribution region that defines a peripheral region of the low-beam light distribution pattern, and the light, which propagates to the outside through the second micro-lens group 302b', may create a mid-zone light distribution region that defines a region between the hot-zone light distribution region and the wide-zone light distribution region.

With continued reference to FIG. 7, the horizontal cross-section of the emergent surface 310b' of the micro-lens 310' in the first micro-lens group 302a' may have a first emergent surface curvature, the horizontal cross-section of the emergent surface 310b' of the micro-lens 310' in the second micro-lens group 302b' may have a second emergent surface curvature smaller than the first emergent surface curvature, and the horizontal cross-section of the emergent surface 310b' of the micro-lens 310' in the third micro-lens group 302c' may have a third emergent surface curvature smaller than the second emergent surface curvature. For example, the first incident surface curvature may correspond or be equal to the first emergent surface curvature, the second incident surface curvature may correspond or be equal to the second emergent surface curvature, and the third incident surface curvature may correspond or be equal to the third emergent surface curvature. In this case, the horizontal cross-section of the emergent surface 310b' of the micro-lens 310' provided in the third micro-lens group 302c' may have a flat shape, and the horizontal cross-section of the emergent surface 310b' of the micro-lens 310' provided in the first to second micro-lens groups 302a' and 302b' may have a shape convex forward.

Figure 8:
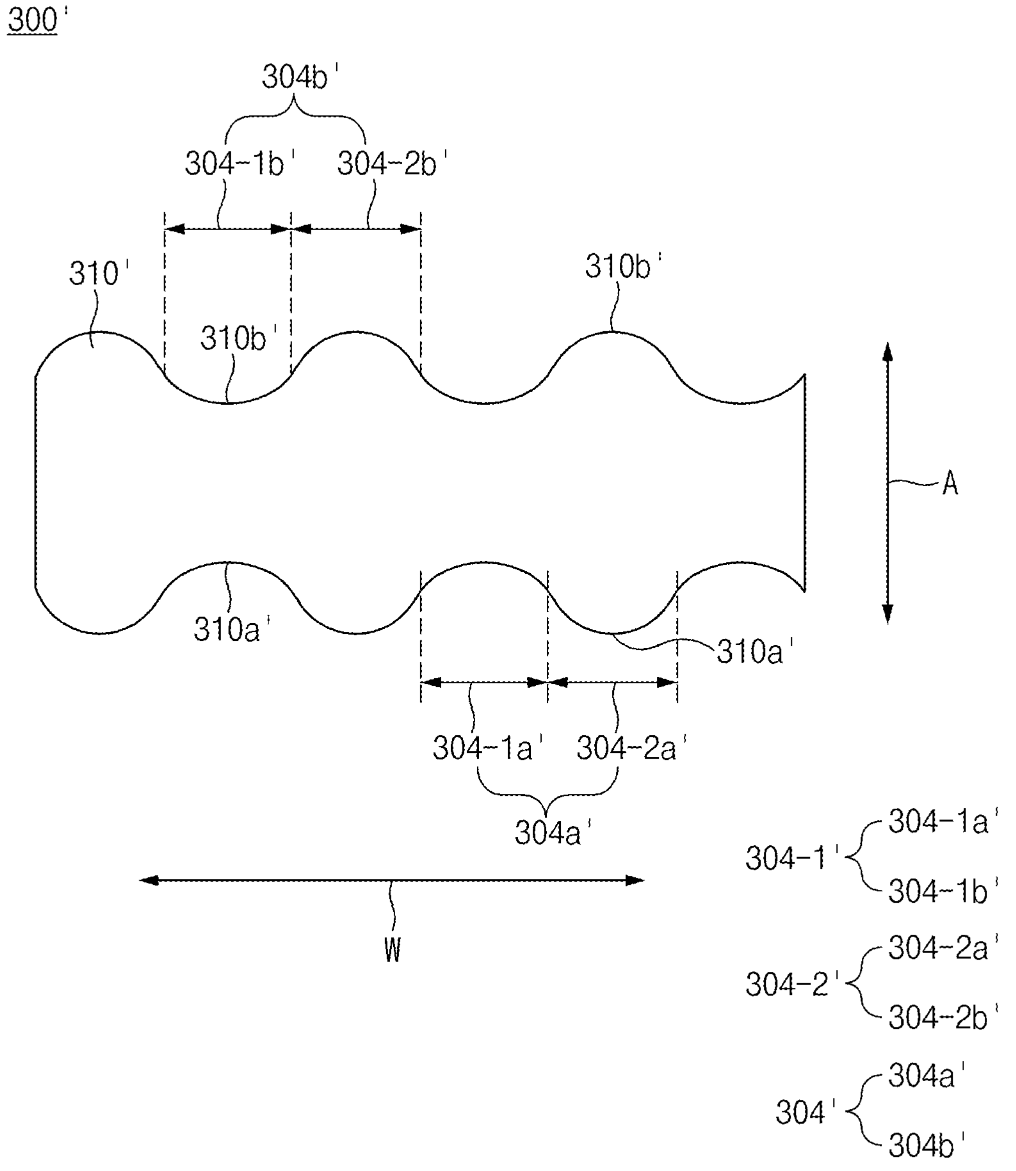
FIG. 8 is a top plan view of a second example of the micro-cylinder lens part provided in the lamp for a vehicle according to another embodiment of the present disclosure.

FIG. 8 is a top plan view of a second example of the micro-cylinder lens part provided in the lamp for a vehicle according to another embodiment of the present disclosure.

With reference to FIG. 8, the horizontal cross-section of the incident surface 310a' or the emergent surface 310b' of the micro-cylinder lens part 300' may include an alternation section 304' in which concave regions 304-1' having concave shapes and convex regions 304-2' having convex shapes are alternately disposed in the leftward/rightward direction W. In this case, the entire alternation section 304' may have a smooth shape. The configuration in which the entire alternation section 304' has a smooth shape may be understood as a configuration in which no pointy portion is present, unlike a case in which only convex regions are repeatedly disposed (see the first micro-lens group in FIG. 7). Alternatively, a boundary section in which the convex region and the concave region meet together may be understood as a kind of inflection point.

More particularly, the horizontal cross-section of the incident surface 310a' of the micro-cylinder lens part 300' may include an alternation incident section 304a' in which concave incident regions 304-1a' having concave shapes and convex incident regions 304-2a' having convex shapes are alternately disposed in the leftward/rightward direction W, and the horizontal cross-section of the emergent surface 310b' of the micro-cylinder lens part 300' may include an alternation emergent section 304b' in which concave emergent regions 304-1b' having concave shapes and convex emergent regions 304-2b' having convex shapes are alternately disposed in the leftward/rightward direction W.

More particularly, the concave incident region 304-1a' in the alternation incident section 304a' may be provided to face the concave emergent region 304-1b' in the alternation emergent section 304b' in the forward/rearward direction A. Further, the convex incident region 304-2a' in the alternation incident section 304a' may be provided to face the convex emergent region 304-2b' in the alternation emergent section 304b' in the forward/rearward direction A.

Figure 9:
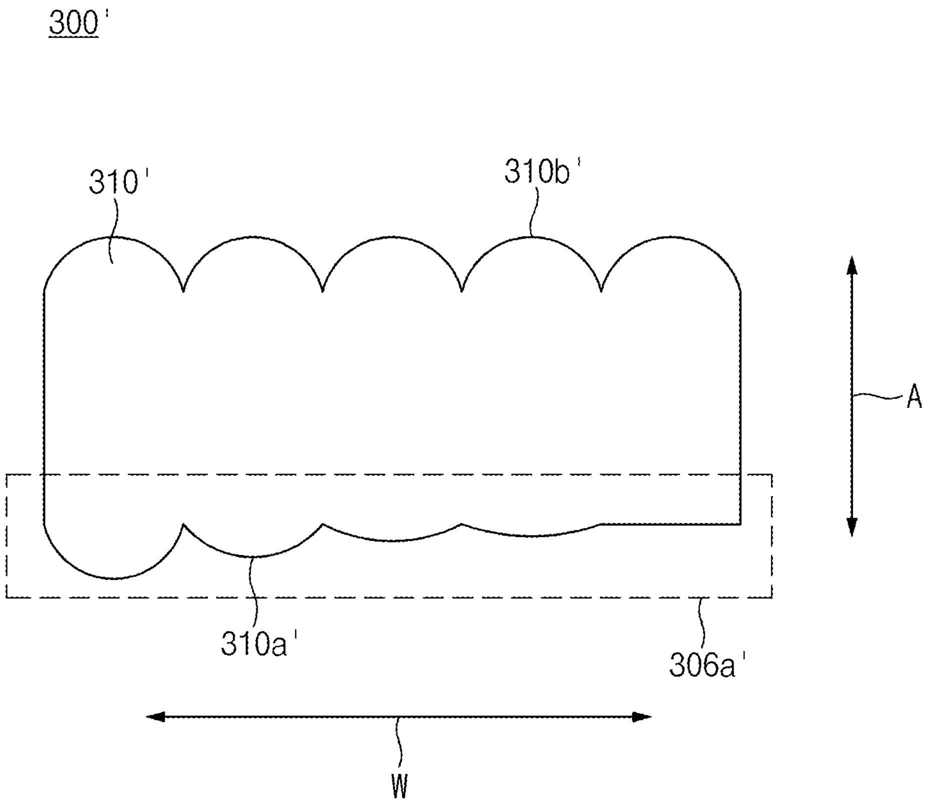
FIG. 9 is a top plan view of a third example of the micro-cylinder lens part provided in the lamp for a vehicle according to another embodiment of the present disclosure.
Figure 10:
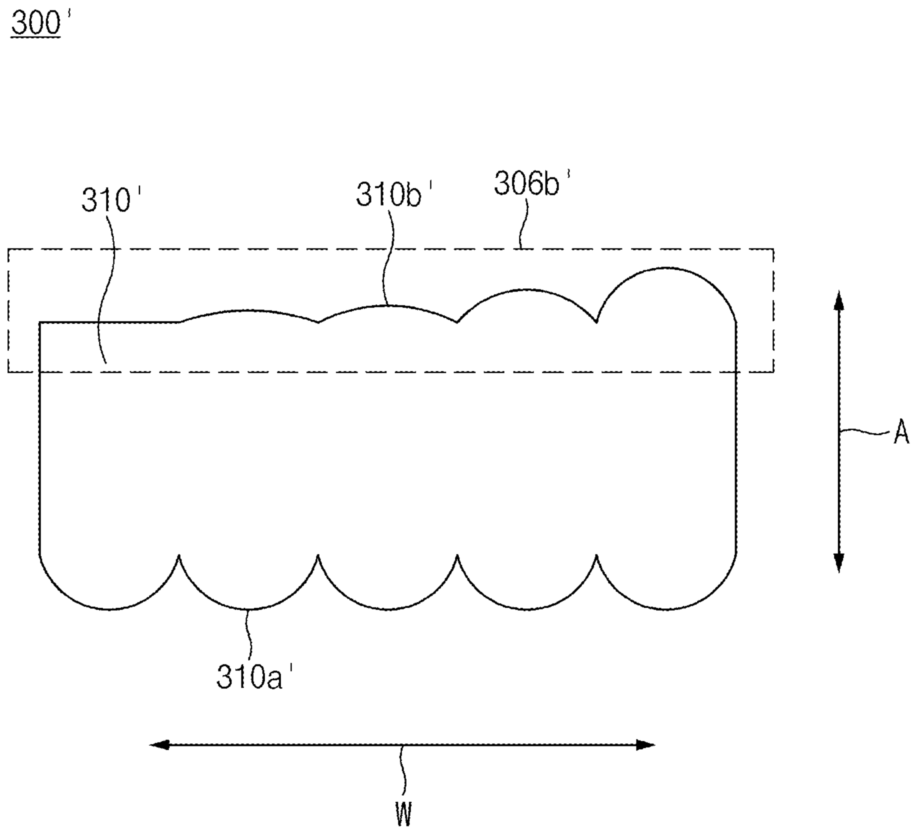
FIG. 10 is a top plan view of a modified example of the third example of the micro-cylinder lens part provided in the lamp for a vehicle according to another embodiment of the present disclosure.

FIG. 9 is a top plan view of a third example of the micro-cylinder lens part provided in the lamp for a vehicle according to another embodiment of the present disclosure, and FIG. 10 is a top plan view of a modified example of the third example of the micro-cylinder lens part provided in the lamp for a vehicle according to another embodiment of the present disclosure.

With reference to FIG. 9, the micro-cylinder lens part 300' may include a variable curvature incident section 306a' in which the horizontal curvatures of the incident surfaces 310a' of the plurality of micro-lenses 310' gradually decrease in one direction of the leftward/rightward direction W. FIG. 9 illustrates a state in which the horizontal curvatures of the incident surfaces 310a' of the micro-lenses 310' gradually decrease rightward in the variable curvature incident section 306a'. For example, FIG. 9 illustrates a state in which the horizontal curvatures of the emergent surfaces 310b', which face the variable curvature incident section 306*a*' in the forward/rearward direction A among the emergent surfaces 310*b*' of the plurality of micro-lenses 310' provided in the micro-cylinder lens part 300', correspond or are equal to one another.

In contrast, as illustrated in FIG. 10, according to the modified example, the micro-cylinder lens part 300' may include a variable curvature emergent section 306*b*' in which the horizontal curvatures of the emergent surfaces 310*b*' of the plurality of micro-lenses 310' gradually decrease in one direction of the leftward/rightward direction W. FIG. 10 illustrates a state in which the horizontal curvatures of the emergent surfaces 310*b*' of the micro-lenses 310' gradually decrease leftward in the variable curvature emergent section 306*b*'. For example, FIG. 10 illustrates a state in which the horizontal curvatures of the incident surfaces 310*a*', which face the variable curvature emergent section 306*b*' in the forward/rearward direction A among the incident surfaces 310*a*' of the plurality of micro-lenses 310' provided in the micro-cylinder lens part 300', correspond or are equal to one another.

Figure 11:
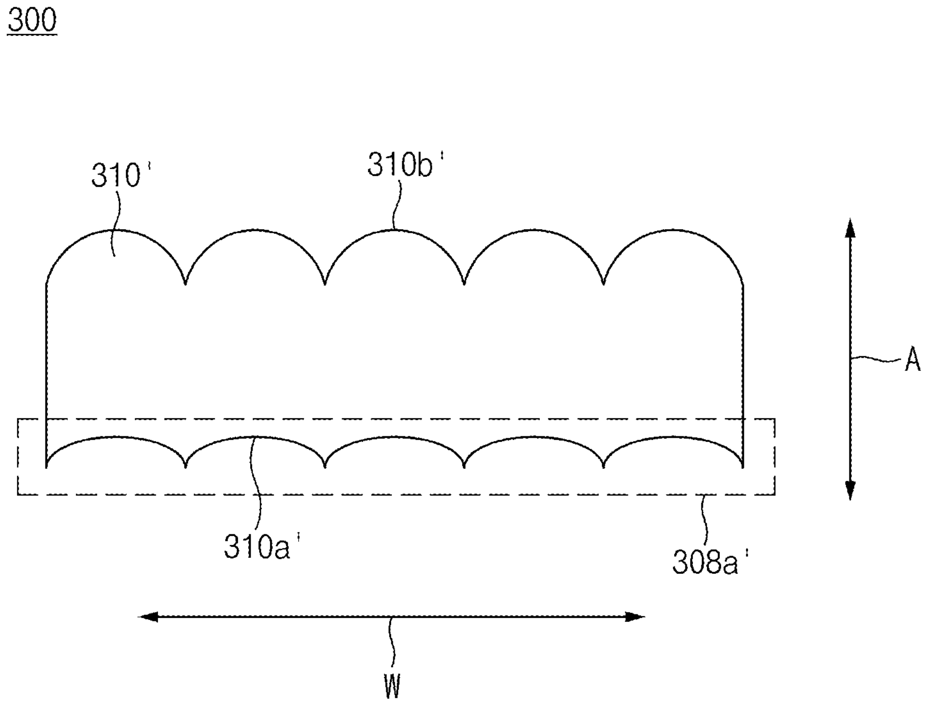
FIG. 11 is a top plan view of a fourth example of the micro-cylinder lens part provided in the lamp for a vehicle according to another embodiment of the present disclosure.
Figure 12:
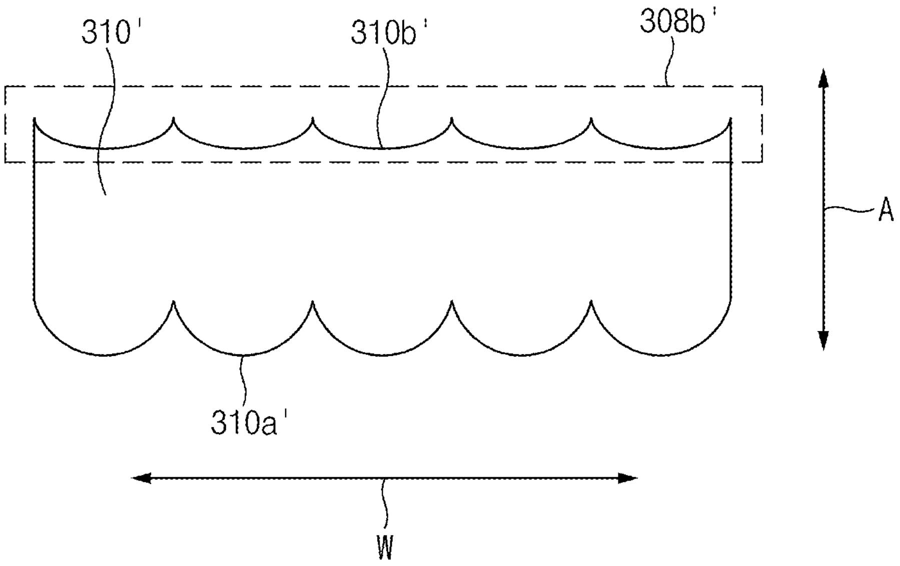
FIG. 12 is a top plan view of a modified example of the fourth example of the micro-cylinder lens part provided in the lamp for a vehicle according to another embodiment of the present disclosure.

FIG. 11 is a top plan view of a fourth example of the micro-cylinder lens part provided in the lamp for a vehicle according to another embodiment of the present disclosure, and FIG. 12 is a top plan view of a modified example of the fourth example of the micro-cylinder lens part provided in the lamp for a vehicle according to another embodiment of the present disclosure.

With reference to FIG. 11, the micro-cylinder lens part 300' may include a concave curvature incident section 308*a*' in which the horizontal cross-sections of the incident surfaces 310*a*' of the plurality of micro-lenses 310' each have a concave shape. For example, the curvatures of the incident surfaces 310*a*' provided in the concave curvature incident section 308*a*' may correspond or be equal to one another. In addition, as illustrated in FIG. 11, the horizontal cross-sections of the emergent surfaces 310*b*', which face the concave curvature incident section 308*a*' in the forward/rearward direction A among the emergent surfaces 310*b*' of the plurality of micro-lenses 310' provided in the micro-cylinder lens part 300', may each have a shape convex forward.

In contrast, as illustrated in FIG. 12, the micro-cylinder lens part 300' may include a concave curvature emergent section 308*b*' in which the horizontal cross-sections of the emergent surfaces 310*b*' of the plurality of micro-lenses 310' each have a concave shape. For example, the curvatures of the emergent surfaces 310*b*' provided in the concave curvature emergent section 308*b*' may correspond or be equal to one another. In addition, as illustrated in FIG. 12, the horizontal cross-sections of the incident surfaces 310*a*', which face the concave curvature emergent section 308*b*' in the forward/rearward direction A among the incident surfaces 310*a*' of the plurality of micro-lenses 310' provided in the micro-cylinder lens part 300', may each have a shape convex rearward.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:

a light source;

an inner lens part disposed forward of the light source; and a micro-cylinder lens part disposed forward of the inner lens part, wherein the inner lens part comprises a plurality of unit lenses disposed in a horizontal direction and physically connected to one another, wherein the micro-cylinder lens part comprises a plurality of micro-lenses disposed in the horizontal direction and physically connected to one another, and wherein a horizontal focal point of an incident surface of each of a first subset of the plurality of unit lenses is different from a horizontal focal point of an incident surface of each of a second subset of the other unit lenses.

2. The lamp of claim 1, wherein an emergent surface of the inner lens part has a smooth curved shape.

3. The lamp of claim 1, wherein the inner lens part has a geometric shape in which horizontal focal points of incident surfaces of the unit lenses become distant, in a forward/rearward direction, from the unit lenses as a distance from a first point in the inner lens part increases in the horizontal direction.

4. The lamp of claim 3, wherein the inner lens part has a geometric shape in which the horizontal focal points of the incident surfaces of the unit lenses become close, in the forward/rearward direction, to the unit lenses as a distance from a second point in the inner lens part increases in the horizontal direction.

5. The lamp of claim 3, wherein the first point is disposed in a horizontal center region of the inner lens part.

6. The lamp of claim 1, wherein each of the plurality of unit lenses optically correspond to a respective one the plurality of micro-lenses.

7. The lamp of claim 1, wherein the inner lens part has a geometric shape that becomes close to a rear side as a distance from a first side decreases in the horizontal direction.

8. The lamp of claim 1, wherein an emergent surface of the inner lens part has a geometric shape in which a curvature of an end region of a first side based on the horizontal direction is larger than a curvature of another region.

9. The lamp of claim 1, wherein a first subset of the plurality of micro-lenses in the micro-cylinder lens part are positioned forward of a second subset of the micro-lenses in the micro-cylinder lens part.

10. The lamp of claim 1, wherein the plurality of micro-lenses in the micro-cylinder lens part are positioned to become close to a rear side as a distance from a first side decreases in the horizontal direction.

11. The lamp of claim 1, wherein widths in a forward/rearward direction of the plurality of micro-lenses in the micro-cylinder lens part correspond to one another.

12. The lamp of claim 1, wherein a width in a leftward/rightward direction of each of a first subset of the plurality of micro-lenses in the micro-cylinder lens part is different from a width in the leftward/rightward direction of each of a second subset of the micro-lenses in the micro-cylinder lens part.

13. The lamp of claim 1, wherein curvatures of incident surfaces or emergent surfaces of the plurality of micro-lenses in the micro-cylinder lens part correspond to one another.

14. The lamp of claim 7, wherein a width in a leftward/rightward direction of each of one or more micro-lenses, which are positioned at an end of the first side based on the horizontal direction among the plurality of micro-lenses in the micro-cylinder lens part, is smaller than a width in the leftward/rightward direction of each of the other micro-lenses in the micro-cylinder lens part.

15. A lamp for a vehicle, the lamp comprising:

a light source;

a micro-cylinder lens part disposed forward of the light source, wherein the micro-cylinder lens part comprises a plurality of micro-lenses disposed in a horizontal direction and physically connected to one another, and wherein a horizontal cross-sectional shape of an incident surface or an emergent surface of each of a first subset of the plurality of micro-lenses disposed in the micro-cylinder lens part is different from a horizontal cross-sectional shape of an incident surface or an emergent surface of each of a second subset of the micro-lenses.

16. The lamp of claim 15, wherein a first group of the plurality of micro-lenses disposed in the micro-cylinder lens part are grouped into a first micro-lens group in which a curvature of a horizontal cross-section of the incident surface is a first incident surface curvature, and wherein a second group of the micro-lenses disposed in the microphone cylinder lens part are grouped into a second micro-lens group in which a curvature of a horizontal cross-section of the incident surface is a second incident surface curvature smaller than the first incident surface curvature.

17. The lamp of claim 16, wherein a third group of the micro-lenses disposed in the micro-cylinder lens part are grouped into a third micro-lens group in which a curvature of a horizontal cross-section of the incident surface is a third incident surface curvature smaller than the second incident surface curvature.

18. The lamp of claim 17, wherein the second micro-lens group is disposed between the first micro-lens group and the third micro-lens group in a leftward/rightward direction W.

19. The lamp of claim 17, wherein a horizontal cross-section of the emergent surface of each micro-lens in the first micro-lens group has a first emergent surface curvature, wherein a horizontal cross-section of the emergent surface of each micro-lens in the second micro-lens group has a second emergent surface curvature smaller than the first emergent surface curvature, and wherein a horizontal cross-section of the emergent surface of each micro-lens in the third micro-lens group has a third emergent surface curvature smaller than the second emergent surface curvature.

20. The lamp of claim 15, wherein a horizontal cross-section of the incident surface or the emergent surface of the micro-cylinder lens part comprises an alternation section in which concave regions having concave shapes and convex regions having convex shapes are alternately disposed in a leftward/rightward direction W, and wherein the entire alternation section has a smooth shape.

* * * * *